UNIVERSAL TUNING SYSTEM FOR TELEVISON RECEIVERS

Original Filed Dec. 20, 1951 5 Sheets-Sheet 1

INVENTOR.
James Edgar Krepps, Jr.
BY Mason, Kolehmainen, Rathburn and Wyss
Attorneys

UNIVERSAL TUNING SYSTEM FOR TELEVISON RECEIVERS

Original Filed Dec. 20, 1951 5 Sheets-Sheet 2

INVENTOR.
James Edgar Krepps, Jr.
BY
Mason, Kolehmainen, Rathburn & Wyss
Attorneys

UNIVERSAL TUNING SYSTEM FOR TELEVISON RECEIVERS

Original Filed Dec. 20, 1951 5 Sheets-Sheet 3

INVENTOR.
James Edgar Krepps, Jr.
BY
Mason, Kolehmainen, Rathburn and Wyss
Attorneys May 27, 1958 J. E. KREPPS, JR 2,836,711

UNIVERSAL TUNING SYSTEM FOR TELEVISON RECEIVERS

Original Filed Dec. 20, 1951 5 Sheets-Sheet 4

INVENTOR.
James Edgar Krepps, Jr.
BY
Mason, Kolehmainen, Rathburn & Wyss
Attorneys May 27, 1958 J. E. KREPPS, JR 2,836,711

UNIVERSAL TUNING SYSTEM FOR TELEVISON RECEIVERS

Original Filed Dec. 20, 1951 5 Sheets-Sheet 5

INVENTOR.
James Edgar Krepps, Jr.
BY
Mason, Kolehmainen, Rathburn & Wyss
Attorneys United States Patent Office 2,836,711
Patented May 27, 1958

2,836,711

UNIVERSAL TUNING SYSTEM FOR TELEVISION RECEIVERS

James Edgar Krepps, Jr., Bloomington, Ind., assignor to Sarkes Tarzian, Inc., Bloomington, Ind., a corporation of Indiana Original application December 20, 1951, Serial No. 262,619, now Patent No. 2,665,377, dated January 5, 1954. Divided and this application December 23, 1953, Serial No. 399,928

7 Claims. (Cl. 250—20)

The present invention relates to television receivers and more particularly to universal tuning systems which are adapted to tune a television receiver to any one of a plurality of relatively low frequency television stations and are also adapted to operate with any one of several different tuning arrangements to tune the receiver to any one of a plurality of relatively high frequency television stations. Specifically, the present invention is a division of my copending application Serial No. 262,619, filed December 20, 1951, and assigned to the same assignee as the present invention, which application has matured into Patent Number 2,665,377.

Under present standards, commercial television transmitting stations are assigned to the so-called V. H. F., or very high frequency, band. This band comprises a group of twelve channels, each 6 mc. wide, which occupy the frequency bands of 54 mc. to 88 mc. and 174 mc. to 216 mc. While these V. H. F. stations are grouped in two different frequency bands, they are, nevertheless, all considered low frequency stations and these V. H. F. stations will be referred to collectively in this specification as relatively low frequency television stations.

Within the very near future, it is expected that an additional frequency band will be allocated to commercial television. This new band is called the U. H. F., or ultra high frequency, band and will include a group of some 70 channels, each 6 mc. wide, which will occupy the frequency band of 470 mc. to 890 mc.

The possibility of active commercial programs on these U. H. F. television channels has required present-day television receiver manufacturers to provide tuning systems for the V. H. F. receivers now being manufactured which are compatible with and adapted for the reception of U. H. F. stations. It is extremely desirable in the present state of the art to provide a universal V. H. F. tuning system which may be incorporated in any of the V. H. F. receivers now being manufactured and which will operate satisfactorily with any one of several different U. H. F. tuning systems to provide complete coverage of both the U. H. F. and V. H. F. television bands. Accordingly, it is an object of the present invention to provide a new and improved television tuning system which is adapted to tune the television receiver to any television station within either the U. H. F. or the V. H. F. television band.

It is another object of the present invention to provide a universal television tuner for the V. H. F. television band which may be utilized in existing V. H. F. receivers and is adapted for use with U. H. F. television tuners of different types for reception of stations within the U. H. F. television band.

It is a further object of the present invention to provide a new and improved television tuning system for both the V. H. F. and U. H. F. television bands wherein the vernier tuning means employed for V. H. F. reception is used as a station selecting means for U. H. F. reception.

It is a still further object of the present invention to provide a new and improved television tuner for reception of V. H. F. television stations which is adapted for use as an I. F. amplifier in conjunction with a preceding U. H. F. television tuner to receive television stations in the U. H. F. band.

It is another object of the present invention to provide a new and improved television tuner for V. H. F. television receivers which is of universal application and wherein provision is made for operation of the receiver either as a dual conversion receiver or a single conversion receiver for the reception of signals from U. H. F. television stations.

It is still another object of the present invention to provide a new and improved universal type television tuner wherein provision is made on the V. H. F. station selector switch for the selection of one or more fixed-tuned U. H. F. tuners or a continuously variable U. H. F. tuner for the reception of signals from U. H. F. television stations.

It is a further object of the present invention to provide a new and improved television tuning system for both the V. H. F. and U. H. F. television bands wherein separate antenna systems are used to receive V. H. F. and U. H. F. signals while employing the same tuning means for both kinds of signals.

Briefly, in accordance with one aspect of the invention there is provided in a television receiver a V. H. F. tuner which is arranged to convert signals received from any one of a plurality of V. H. F. television stations into corresponding intermediate frequency signals which are amplified and detected in the usual manner. The V. H. F. tuner includes a station selector switch for the selection of any one of the existing V. H. F. television stations and a vernier tuning knob for precise adjustment of the tuner to any one of the selected V. H. F. television stations and the station selector switch is also provided with a plurality of U. H. F. receiving positions. To receive U. H. F. television stations, a continuous U. H. F. tuner or one or more single station U. H. F. tuners is employed and the V. H. F. tuner signal translating stages are operated as I. F. amplifiers for the reception of U. H. F. stations when the station selector switch is in a U. H. F. receiving position. The main tuning shaft of the continuous U. H. F. tuner is ganged with the verneir tuning means of the V. H. F. tuner and the local oscillator of the V. H. F. tuner is disabled during U. H. F. reception so that the same vernier tuning means of the V. H. F. tuner may be used for the selection of U. H. F. stations.

In accordance with a further aspect of the invention, the V. H. F. tuner is provided with circuit means for selectively energizing any one of a plurality of single station U. H. F. tuners or a continuous type U. H. F. tuner and of indicating which one of the single-station tuners is in operation. Provision is also made in the universal V. H. F. tuner for the operation of the tuner as a second converter in a dual conversion super-heterodyne system, the first intermediate frequency of this dual conversion system being located between the upper and lower frequency bands of the V. H. F. television band or below the lower frequency band.

The invention, both as to its organization and method of operation, together with further objects and advantages thereof, will best be understood by reference to the following specification taken in connection with the accompanying drawings in which.

Figure 1:
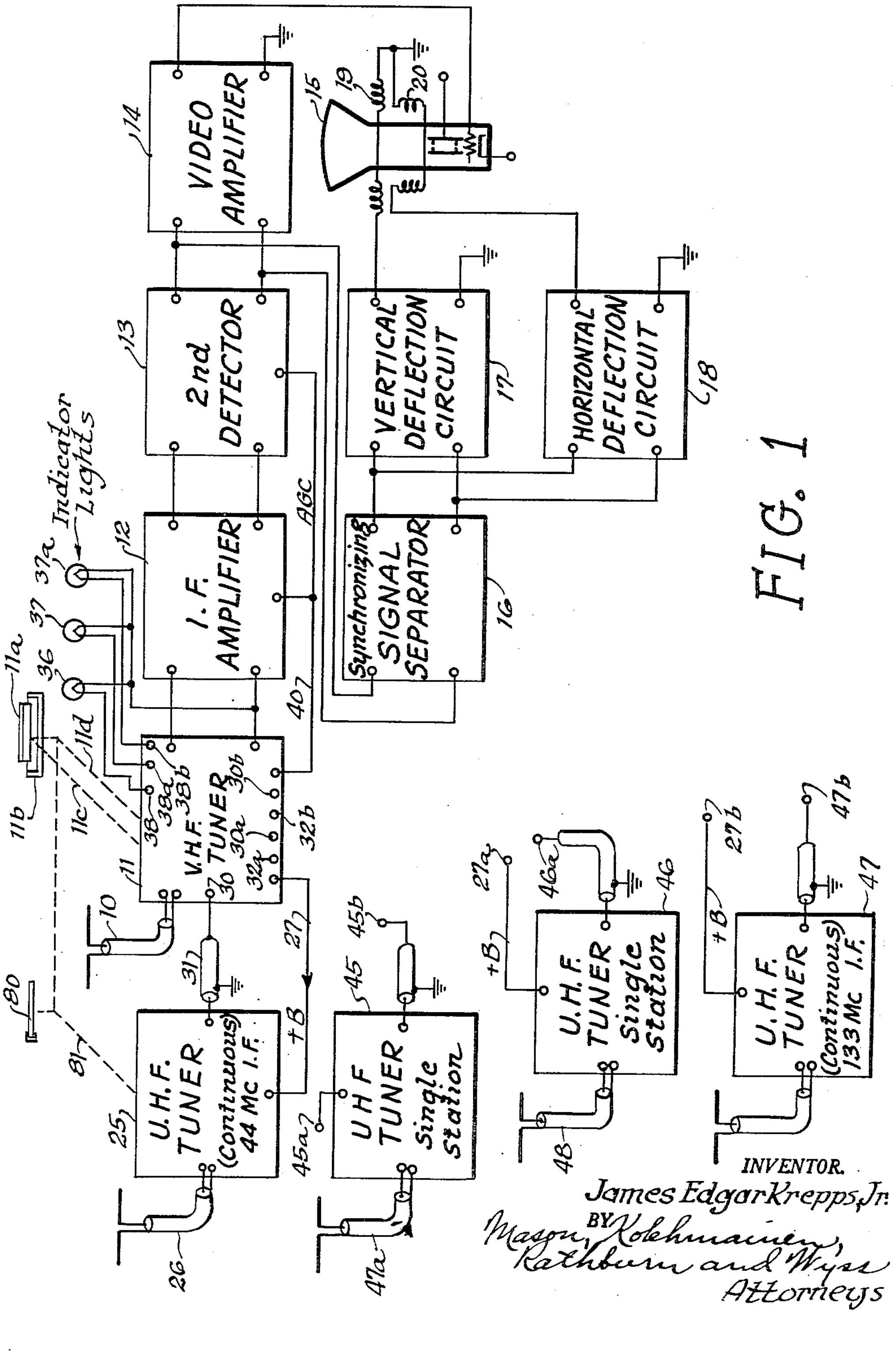
Fig. 1 is a block diagram of a television receiver employing the universal television tuning system of the present invention.
Figure 4:
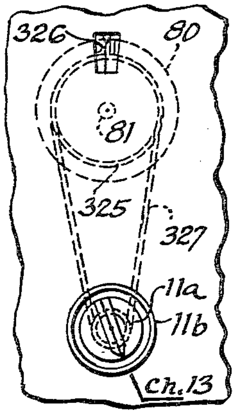
Figure 5:
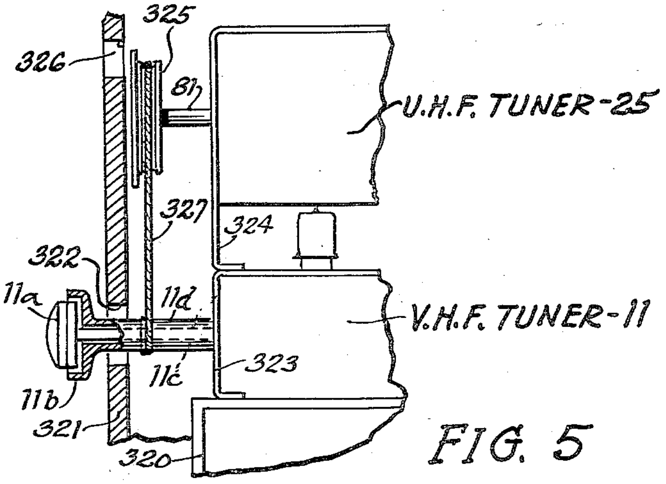
Figure 6:
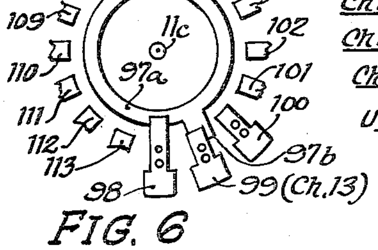
Figure 7:
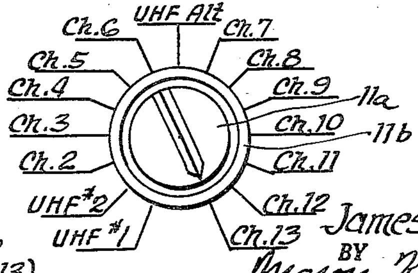
Figure 3A:
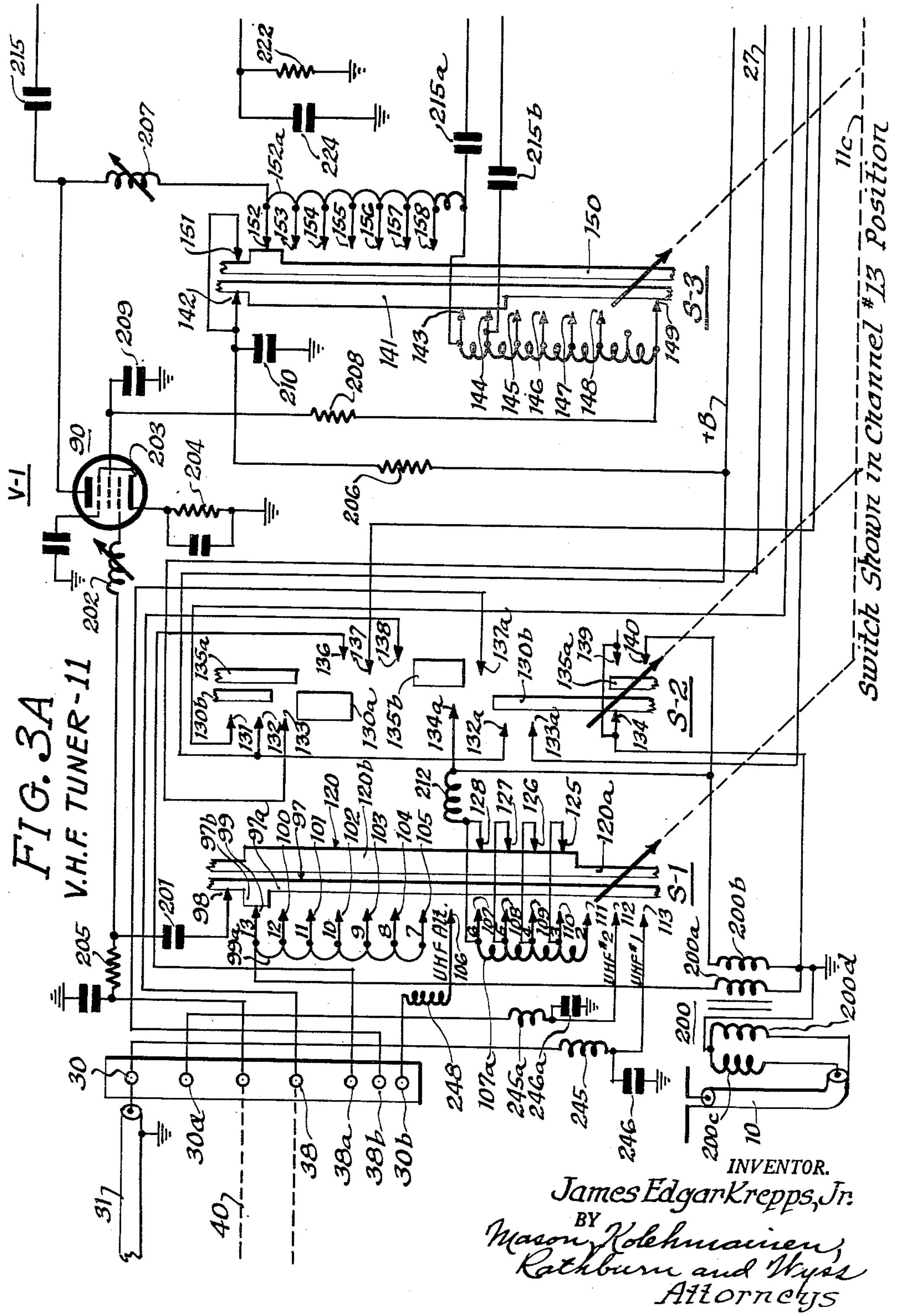
Figure 3B:
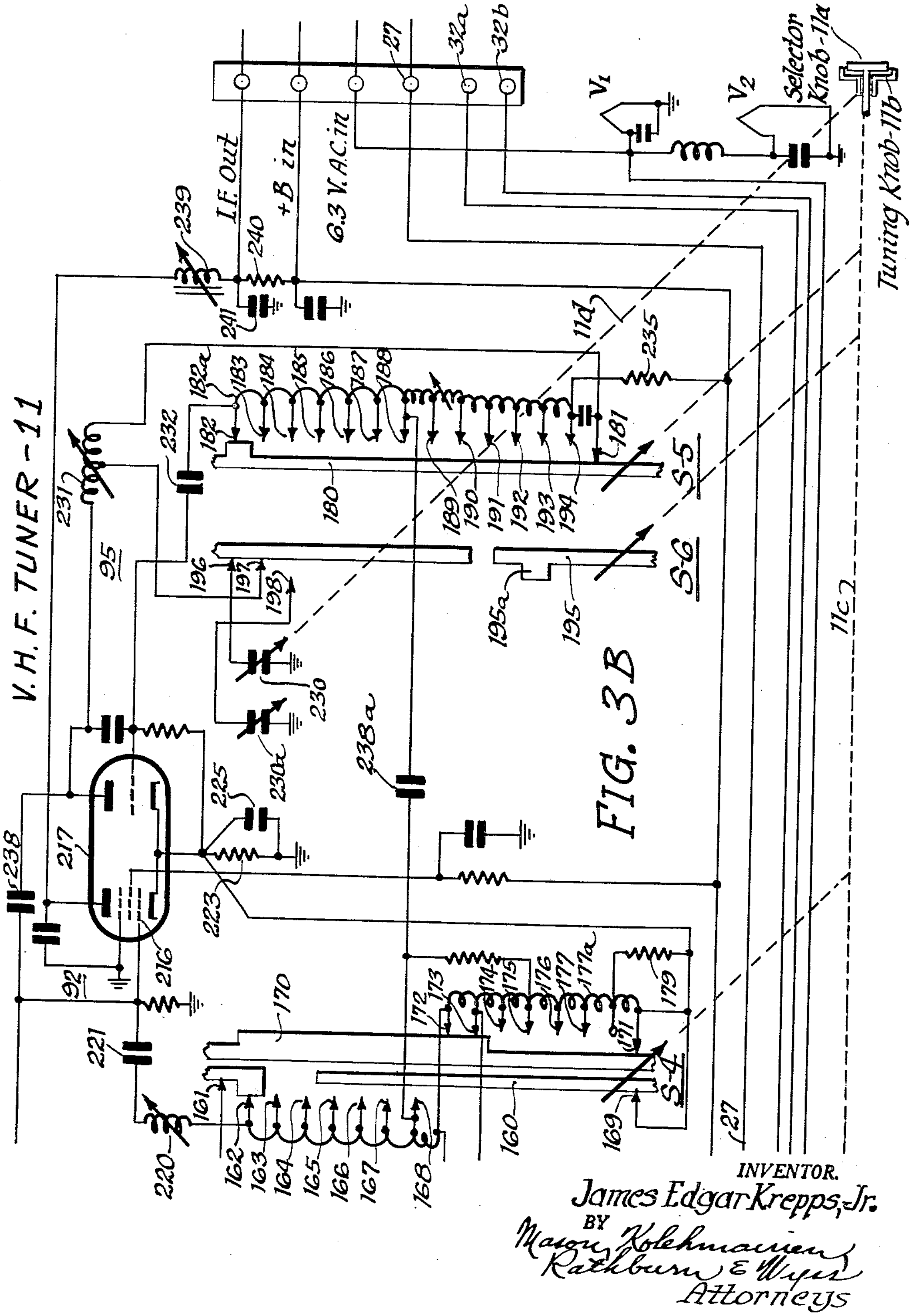
Figures 8, 9, 10, 11, 12, 13, 14, 15, 16:
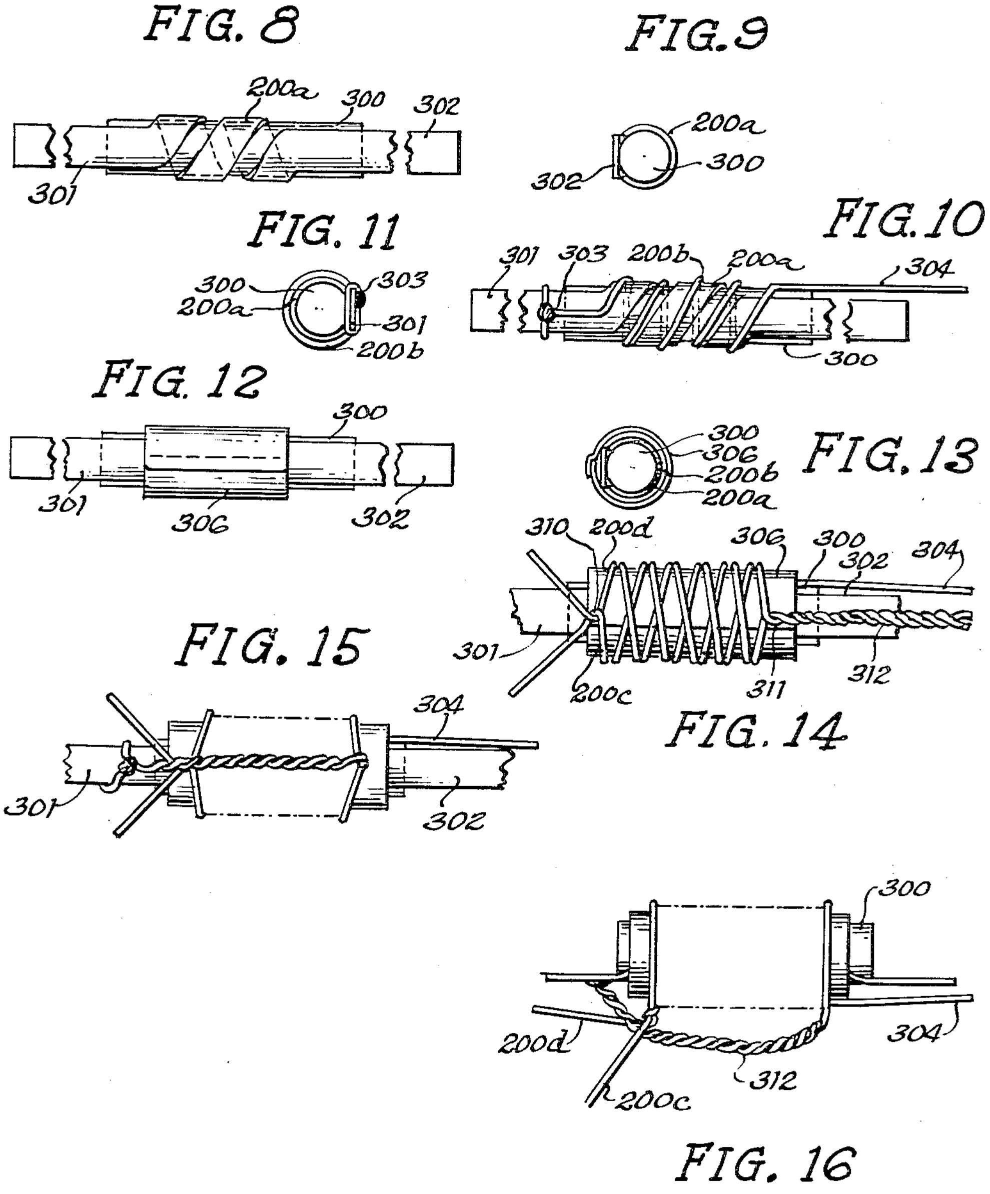

U. H. F. tuner of the continuous type which may be employed in the television receiver of Fig. 1;

Figs. 3A and 3B, when laid side by side, show a detailed schematic diagram of the universal V. H. F. tuner portion of the television receiver of Fig. 1;

Figs. 4 and 5 are fragmentary front and side views respectively of the universal tuning system of the present invention illustrating one way in which the U. H. F. and V. H. F. tuners may be mechanically interconnected;

Fig. 6 is a somewhat diagrammatic front view of one section of the station selector switch used in the V. H. F. tuner portion of the receiver of Fig. 1;

Fig. 7 is a similar front view of a preferred arrangement of the station selector and tuning means of the V. H. F. tuner of Fig. 1;

Fig. 8 is an elevational view of the core and one winding of a preferred antenna input arrangement for the receiver of Fig. 1;

Fig. 9 is an end view of the arrangement of Fig. 8;

Figs. 10 and 11 are elevational and end views, respectively, of the arrangement of Fig. 8 showing an additional winding thereon;

Figs. 12 and 13 are elevational and end views of the arrangement of Fig. 8 at a different stage in the construction thereof;

Figs. 14 and 15 are side elevational views of the arrangement of Fig. 8 showing additional steps in the construction thereof; and Fig. 16 is a plan view of the arrangement of Fig. 8 in its completed form.

Referring now to the drawings and more particularly to Fig. 1 thereof, the system there illustrated comprises a television receiver which is adapted for reception of signals from both U. H. F. and V. H. F. television stations. The V. H. F. portion of the receiver is of the super-heterodyne type and includes a V. H. F. antenna system indicated generally at 10 which is connected to a universal V. H. F. tuner 11 which comprises, in general, a radio frequency amplifier, a local oscillator and a signal mixer or converter. The intermediate frequency output of the V. H. F. tuner 11 is connected to an I. F. amplifier 12 to which are connected in cascade in the order named a second detector 13, a video frequency amplifier 14 and an image reproducing cathode ray tube 15. The output of the second detector 13 is connected to a synchronizing signal separator circuit 16 which provides synchronizing signals for a vertical deflection circuit 17 and a horizontal deflection circuit 18. The outputs of the deflection circuits 17 and 18 are coupled respectively to the vertical and horizontal deflection coils 19 and 20 which surround the neck of the cathode ray tube 15. The stages or units 12 to 20, inclusive, may all be of conventional well-known construction so that a detailed illustration and description thereof is deemed unnecessary herein.

Referring briefly, however, to the general mode of operation of the V. H. F. receiving system described above, television signals from any one of the existing V. H. F. television stations, i. e. signals in the frequency bands of 54 to 80 mc. and 174 to 216 mc., which are intercepted by the antenna system 10, are selected by means of the station selector switch **11*a* of the V. H. F. tuner 11, and are amplified in the R. F. amplifier portion of the tuner 11 and converted into corresponding signals of an intermediate frequency in the converter portion of the V. H. F. tuner 11. In the I. F. amplifier 12, the I. F. signals are further amplified and delivered to the second detector 13 wherein the modulation components of the received signals are detected and supplied to the video frequency amplifier 14 where they are further amplified and from which they are supplied in the usual manner to a control electrode of the image reproducing device 15. The detected composite television signal is supplied to the synchronizing signal separator 16 which separates the horizontal and vertical synchronizing signals from the video signals and supplies the separated signals to the deflection circuits 17 and 18. The scanning waves which are generated in the horizontal and vertical deflection circuits 17 and 18 are controlled by the synchronizing voltages supplied thereto and are supplied to the scanning coils 19 and 20** to produce electromagnetic scanning fields which deflect the scanning ray in two directions perpendicular to one another so as to trace a rectilinear scanning pattern on the screen and thereby reconstruct the transmitted image.

Referring now more particularly to the portions of the receiver of Fig. 1 which embody the present invention, the V. H. F. tuner 11 is provided with a vernier tuning knob **11*b* which is used to make a precise adjustment of the frequency of the local oscillator portion of the V. H. F. tuner 11. The knob 11*b* is preferably connected to a sleeve-like tuning shaft 11*d* which is concentric with the shaft 11*c* of the station selector switch 11*a* and the tuning shaft 11*d* is mechanically ganged to the main tuning shaft 81 of a U. H. F. tuner 25. A U. H. F. receiving antenna system indicated generally at 26, is connected to the input terminals of the U. H. F. tuner 25 and an energizing potential for the local oscillator of the U. H. F. tuner 25 is supplied from the V. H. F. tuner 11 over the conductor 27. The U. H. F. tuner 25 is of the continuously variable type and converts the received U. H. F. signals into corresponding intermediate frequency signals which may be of the same intermediate frequency as the I. F. amplifier 12**.

The intermediate frequency output of the U. H. F. tuner 25 is connected to a separate input terminal 30 of the V. H. F. tuner 11, by any suitable means such as the illustrated coaxial cable 31, and the V. H. F. tuner 11 is operated during U. H. F. reception as an I. F. amplifier for the intermediate frequency signals produced by the U. H. F. tuner 25. To this end, the input circuit of the V. H. F. tuner 11, as is more fully explained hereinafter, is switched by means of the station selector switch **11*a* from the V. H. F. antenna system 10 to the input terminal 30 and, at the same time, an operating potential is supplied over the conductor 27 to the U. H. F. tuner 25 to energize the local oscillator thereof. Also, when the selector switch 11*a* is actuated to the U. H. F. position, the signal translating stages of the V. H. F. tuner 11 are caused to operate as I. F. amplifiers for signals of the intermediate frequency output of the U. H. F. tuner 25, and one of the indicator lamps, such as the lamp 36, is energized by means of an alternating current which is supplied from the output terminal 38 of the V. H. F. tuner 11 to indicate that the U. H. F. tuner 25 is being used. The intermediate frequency signals produced by the U. H. F. tuner 25 are then amplified in the V. H. F. tuner 11 and supplied to the I. F. amplifier 12 wherein they are further amplified in the manner described above and employed in the remaining components of the systems to reconstruct the transmitted image. The R. F. amplifier of the V. H. F. tuner 11 and the I. F. amplifier 12 are preferably controlled by means of an automatic gain control voltage which is derived, for example, from the second detector 13 and impressed upon the AGC conductor 40**.

In the reception of ultra high frequency signals, it is sometimes convenient to employ one or more so-called fixed-tuned U. H. F. tuners which may be tuned by means of a screwdriver adjustment to receive one particular station within the U. H. F. television band. In order to provide for the reception of signals from two single station U. H. F. tuners, the V. H. F. tuner 11 is provided with a second input terminal **30*a* so that the output terminal 45*b* of a first, fixed-tuned or single station U. H. F. tuner 45 may be connected to the input terminal 30 and the output terminal 46*a* of a second single station U. H. F. tuner 46 may be connected to the alternative input terminal 30*a*, it being understood, of course, that the continuous tuner 25 is not connected to the input terminal 30 in the event that single station tuners are employed. The conductor 27 is connected to the +B terminal 45a of the tuner 45 and an alternative +B terminal 32a of the V. H. F. tuner 11 is connected to the +B terminal 27a of the tuner 46. The single station U. H. F. tuners 45 and 46 may be provided with separate antenna systems 47a and 48, respectively, or in the alternative, both of the units 45 and 46 may be operated from the same ultra high frequency television antenna. The intermediate frequency output terminals 45b and 46a of the single station tuners 45 and 46 may be selected by means of the station selector switch 11a in the universal V. H. F. tuner 11 and the selected intermediate frequency signals are amplified in the V. H. F. tuner 11 which is operated as an I. F. amplifier for both of the above described station selector positions wherein the terminals 30 and 30a are connected to the input of the V. H. F. tuner 11. Coincidentally with the connection of the input of the tuner 11 to the terminal 30, an energizing potential is supplied over the conductor 27 to the local oscillator of the tuner 45 so that this tuner is energized. When the station selector switch 11a is thrown to the other position in which the input of the tuner 11 is connected to the input terminal 30a, energizing potential is removed from the conductor 27 and is supplied by way of the terminal 32a and the terminal 27a to the tuner 46 to energize the same. The indicator lamps 36 and 37 are selectively energized by applying an alternating current to either one of the output terminals 38 or 38a when one or the other of the single station tuners 45 or 46 is energized. The lamps 36 and 37** may be of different colors to indicate which single station tuner is being used.

In some instances, it is desirable to provide a dual conversion system for U. H. F. reception, in which case the universal V. H. F. tuner 11 is arranged to perform the second conversion of frequency. In such case, a continuous type U. H. F. tuner 47 may be employed which has an intermediate frequency output which is located between the upper and lower portions of the V. H. F. band, i. e., in the vicinity of 133 mc., the output terminal 47b of the tuner 47 being connected to an alternative input terminal 30b of the V. H. F. tuner 11 and the +B terminal 27b of the tuner 47 being connected to an alternative +B terminal 32b in the tuner 11. When the station selector switch 11a is thrown to the correct position the input of the V. H. F. tuner 11 is connected to the alternative input terminal 30b, energizing potential is supplied to the terminal 32b, and the V. H. F. tuner 11 amplifies the intermediate frequency signal from the U. H. F. tuner 47 and converts the amplified intermediate frequency signal into a lower frequency intermediate frequency signal which is then supplied to the I. F. amplifier 12.

In Fig. 7 there is shown a preferred arrangement of the station selector switch 11a and vernier tuning knob 11b of the universal V. H. F. tuner 11 of Fig. 1. Referring to this figure, the selector switch is provided with 12 V. H. F. station selector positions for selecting any one of the existing channels 2 to 13, inclusive, which comprise the V. H. F. television band. Midway between the channel 2 and the channel 13 positions of the switch, there is provided a U. H. F. #1 position in which position the terminal 30 is connected to the input of the universal V. H. F. tuner 11 as desribed above in connection with Fig. 1. The switch 11a is also provided with an adjacent position U. H. F. #2 position in which position the input terminal 30a is connected to the input of the V. H. F. tuner 11. Midway between the channel 6 and channel 7 positions of the switch 11a, there is provided a U. H. F. alternate position in which position the input terminal 30b is connected to the input of the V. H. F. tuner 11. In this position, the universal V. H. F. tuner 11 is operated as a second converter in a dual conversion system. In the positions U. H. F. #1 and U. H. F. #2, the universal V. H. F. tuner 11 is operated as an I. F. amplifier at the same intermediate frequency as the I. F. amplifier 12.

Figure 2:
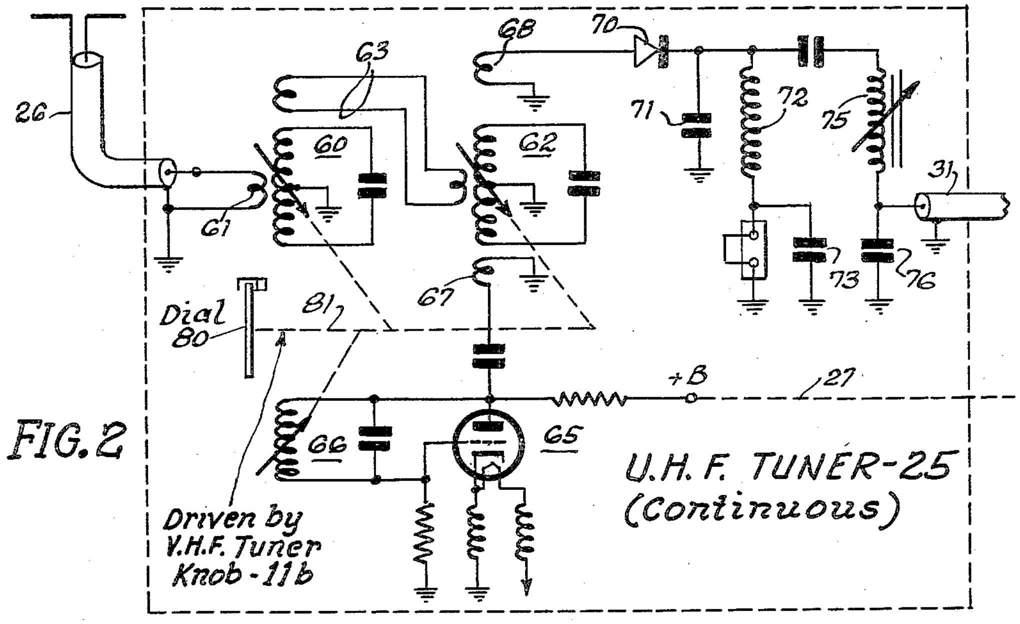
Fig. 2 is a detailed schematic diagram of a typical

The continuous U. H. F. tuner 25 may comprise any suitable circuit arrangement for converting signals from any one of the stations in the U. H. F. television band into corresponding signals of the same intermediate frequency as the frequency to which the I. F. amplifier 12 (Fig. 1) is tuned. The U. H. F. tuner 25 is capable of being continuously tuned throughout the band of 470 to 890 mc. and has suitable band width and selectivity characteristics to select any particular television station in this band. For example, the U. H. F. tuner 25 may comprise a circuit arrangement substantially as shown in Fig. 2 of the drawings wherein signals received by the U. H. F. antenna system 26 are coupled into a first resonant tank circuit indicated generally at 60 by any suitable means such as the coupling loop 61. The resonant tank circuit 60 may be tuned to the frequency of the incoming U. H. F. signal by variation of either the inductive branch of the resonant circuit or the capacitive branch, or both, as will be evident to those skilled in the art, and the tank circuit 60 is provided with suitable band width and selectivity characteristics to select any desired television station within the U. H. F. band. Television signals which are selected in the tank circuit 60 may be coupled to a mixer tank circuit, indicated generally at 62, by any suitable means such as the link coupling circuit indicated generally at 63. The tank circuit 62 may be substantially identical to the tank circuit 60 and is tuned by variation of either the capacitive or inductive branches thereof, or both. Local oscillations are generated in a local oscillator stage indicated generally at 65, the stage 65 being provided with a resonant tank circuit 66 which is preferably tuned above the U. H. F. television signal by an amount equal to the desired intermediate frequency output and the tank circuit 66 may be tuned by variation of either the inductive or capacitive branches thereof to provide the necessary frequency variation of the locally generated oscillations. The oscillations produced by the local oscillator stage 65 are coupled by any suitable means such as the coupling loop 67 to the mixer tank circuit 62. Both the incoming signal and the locally generated oscillations are extracted from the tank circuit 62 by any suitable means such as the coupling loop 68 and are coupled to a crystal mixer or detector 70. The coupling loop 68 is connected to the cathode of the crystal 70 and the anode thereof is connected through the R. F. bypass condenser 71 to ground. A radio frequency choke 72 may also be connected to the anode of the crystal 70 and used in conjunction with a bypass condenser 73 to measure crystal current as will be readily apparent to those skilled in the art. The crystal 70 may comprise a germanium crystal, or other suitable detector unit having a non-linear current-voltage characteristic so that sum and difference frequencies are produced in the detector output circuit. An output circuit which is tuned to the desired intermediate frequency is provided for the crystal 70 and includes the variable inductance 75 and the condenser 76 which together form a resonant circuit which is tuned to a nominal intermediate frequency of 44 mc. for example. Intermediate frequency signals produced across the condenser 76 may be coupled by any suitable means such as the coaxial cable 31 to the input circuit of the V. H. F. tuner 11 (Fig. 1). The variable tuning elements of the tank circuits 60, 62 and 66 are mechanically ganged together so that they may be driven by a common tuning shaft which, as described briefly above, is connected to and driven by the tuning shaft of the vernier tuning knob 11b in the V. H. F. tuner 11. There is also provided an indicator dial 80 which is driven by the common tuning shaft and serves to indicate the particular U. H. F. station to which the U. H. F. tuner 25 is tuned. Energizing potential for the local oscillator stage 65 of the U. H. F. tuner 25 is supplied from the V. H. F. tuner 11 over the conductor 27. Heater voltage for the filament of the local oscillator stage 65 may be supplied from any suitable source such as the main filament transformer of the television receiver so that the local oscillator tube of the U. H. F. tuner 25 is continuously heated and ready for immediate operation as soon as an energizing potential is supplied thereto over the conductor 27.

While the U. H. F. tuner 25 shown in Fig. 2 has been described in some detail in view of the present state of the art and in order to provide a complete understanding of the present invention, it will be understood that any other type of continuous U. H. F. tuner may be employed in so far as the present invention is concerned. Thus, any suitable continuous tuning means may be employed which will convert the U. H. F. television signal into a suitable intermediate frequency signal and which employs a common tuning shaft for the variable tuning elements of the tuner.

Referring now in more detail to the universal V. H. F. tuner 11, there is shown in Figs. 3A and 3B of the drawings a schematic diagram of a suitable tuner circuit embodying certain aspects of the present invention. Referring to these figures, the V. H. F. tuner 11 comprises a first dual purpose signal translating stage indicated generally at 90, a second dual purpose signal translating stage indicated generally at 92, a local oscillator stage indicated generally at 95, and a plural-section station selector switch having the switch wafers S–1, S–2, S–3, S–4, S–5 and S–6 which are commonly controlled by means of the station selector switch shaft 11c. Preferably, the selector switch and circuit components of the V. H. F. tuner 11 are completely shielded by means of the improved arrangement shown in U. S. Patent No. 2,497,747, issued to A. A. Valdettaro and assigned to the same assignee as the present invention. As described briefly above, the station selector switch is of the rotary type and is provided with 16 switch positions, 12 of which are used for the reception of the 12 V. H. F. television stations, and 3 of which are used for U. H. F. reception with different types of ultra high frequency tuning arrangements, the remaining position being used for the common switch contacts of each switch rotor so that one position is blank in so far as station selection is concerned.

In the schematic diagram of Figs. 3A and 3B the switch rotors of each switch section are illustrated in developed form to simplify the illustration of the circuit connections thereto. However, it will be understood that each of the switch sections S–1 to S–6, inclusive, includes an annular rotor plate or plates and a plurality of angularly spaced stator switch contacts. For example, as shown in Fig. 6, the first rotor plate 97 of the switch section S–1 comprises an annular portion 97a to which electrical contact is continuously made by means of the fixed stator wiping contact 98, and a tongue portion 97b which sequentially connects the stator contact 98 to any one of the stator contacts 99 to 113 inclusive. The switch section S–1 further comprises a second rotor plate 120 (Fig. 3A), which is positioned on the opposite side of the insulated switch rotor from the rotor plate 97 and comprises the relatively narrow annular band 120a and a relatively wide tongue portion 120b which short circuits the contacts 125 to 128, inclusive, in the channel 13 position shown in Fig. 3A.

In a similar manner the switch section S-2 comprises the arcuate rotor segments 130a and 130b. The segment 130a connects the contact 132 to the contact 131 in the U. H. F. #2 position and to the contact 133 in the U. H. F. #1 position. The segment 130b is used to connect the contacts 134 and 134a together in either of the switch positions U. H. F. #1 or U. H. F. #2. The switch section S–2 further comprises a second set of segmental rotor plates 135a and 135b. The plate 135b connects the stator contact 137 to the contact 138 in the U. H. F. #1 position and to the contact 136 in the U. H. F. #2 position, and also connects the contacts 139 and 140 together in the switch position U. H. F. Alt. The rotor plate 135a connects the contacts 137 and 137a together in the U. H. F. Alt. position.

The switch section S–3 comprises a first rotor plate 141 which connects the common stator contacts 142 and 149 together and short circuits the intermediate stator contacts 143 to 148, inclusive, in successive switch positions. The section S–3 further comprises a rotor plate 150 which connects the common stator contact 151 with successive ones of the stator contacts 152 to 158, inclusive. The switch section S–4 (Fig. 3B) includes a first rotor plate 160 which connects the common stator contact 161 to the common stator contact 169 in all positions except the switch positions U. H. F. #1 and U. H. F. #2 and further connects the common switch contacts 161 and 169 to successive ones of the stator contacts 162 to 168, inclusive. The switch section S–4 also includes a rotor plate 170 which connects a common stator contact 171 to the intermediate stator contacts 172 to 177, inclusive. The switch section S–5 includes the rotor plate 180 which connects the common stator contact 181 to successive ones of the stator contacts 182 to 194, inclusive. Finally, the switch wafer S–6 includes the rotor plate 195 which connects the contacts 196 and 197 together in all positions except the U. H. F. Alt. position and connects the contacts 197 and 198 together in the U. H. F. Alt. position. It will be noted that in each of the wafers S–1, S–2, S–3 and S–4, each of the stator contact positions is used for only one circuit connection or, in the alternative, two stator contacts in the same position are electrically connected together. With this arrangement the complexity of the switch is materially decreased and a switch which can be readily manufactured at low cost is provided. The station selector switch is shown in the channel 13 position in Figs. 3A and 3B and as the switch shaft 11c is rotated in the counterclockwise direction as viewed in Figs. 6 and 7, the switch rotors are moved downwardly from the positions shown in Figs. 3A and 3B.

In order to tune the input and output circuits of the first translating stage 90 and the input circuit of the second translating stage 92 to any one of the V. H. F. television signals, the switch sections S–1, S–3 and S–4 are connected to individual tuned circuits so as to change the inductance of each tuned circuit by fixed inductive increments for each change in the switch position. Likewise, the switch section S–5 is connected to change the inductance of the local oscillator tank circuit by fixed inductive increments to tune the local oscillator to the correct frequency for each of the received V. H. F. television signals.

Considering the circuit arrangement when the selector switch is in the channel 13 position shown in Figs. 3A and 3B, signals which are received by the antenna system 10 are coupled to the input transformer 200 which is provided with a pair of balanced primary windings 200c and 200d and a pair of secondary windings 200a and 200b. Signals appearing across the secondary winding 200a are connected through the switch contacts 99 and 98, the condenser 201 and the inductance 202 to the first control grid of the tube 203 of the first translating stage 90. In the channel 13 position the input circuit is tuned to the highest V. H. F. signal so that the circuit inductance is at a minimum and comprises primarily the inductance 202 and the inductance included in the switch rotor between the contacts 98 and 99 and lead inductances.

In each of the channel positions 2 to 13, inclusive, of the station selector switch the tube 203 is operated as a radio frequency amplifier for the V. H. F. signals coupled to the first control grid thereof. Thus, the tube 203 is self-biased by means of the cathode bias resistor 204, and an automatic gain control voltage from the second detector 13 (Fig. 1), or a suitable keyed AGC circuit, is connected over the conductor 40 and through the grid resistor 205 and inductance 202 to the first control grid of the tube 203. Operating anode potential for the tube 203 is supplied through the decoupling resistor 206, the switch contacts 151 and 152 and the inductance 207 to the anode of the tube 203 and this potential is also supplied through the switch rotor plate 141, the contacts 142 and 149 and the dropping resistor 208 to the screen grid of the tube 203. Appropriate bypass condensers 209 and 210 are connected respectively to the screen grid resistor 208 and the anode resistor 206.

Considering now the manner in which the input circuit of the tube 203 is varied by fixed inductive increments as different V. H. F. stations are selected, when the station selector switch is moved to the channel 12 position the contacts 98 and 100 are connected together and the small incremental inductance 99*a* connected between the contacts 99 and 100 is inserted into the input circuit. The incremental inductance 99*a* may comprise a single half turn or loop of wire connected between the terminal lugs of the stator contacts 99 and 100. In a similar manner, when the switch is turned to the channel 11 position the contacts 98 and 101 are connected together so that the additional incremental inductance between the fixed contacts 100 and 101 is inserted into the circuit. The same incremental variation in the inductance of the input circuit obtains until the station selector switch is moved to the channel 6 position at which time the winding 200*a* is open circuited and the secondary winding 200*b* serves as the input winding for the input tube 203. Thus, in the channel 6 position the V. H. F. signals produced across the winding 200*b* are coupled through the inductance 212 and through the switch contacts 107 and 98 which are connected together through the rotor 97, and through the coupling condenser 201 and the inductance 202 to the first control grid of the tube 203. The series inductance 212 is of sufficient value together with the inductance 202 and the remaining circuit inductances to tune the input circuit of the tube to the relatively low frequency of channel 6. In this connection it will be understood that there is a frequency gap of 86 mc. between channels 6 and 7 so that the inductance necessary to tune the input circuit to channel 6 is substantially larger than for channel 7 and the inductance 212 may be a coil of several turns. As the station selector switch is moved to the channel 5 position the contacts 127 and 128, which have previously been short circuited by the rotor plate 120*b*, are open circuited so as to insert the incremental inductance 107*a* appearing between the fixed stator contacts 107 and 108 in series with the inductance 212 to the control grid of the tube 203. As the selector switch is moved to the lower numbered channel positions the additional incremental inductances appearing between the contacts 108 to 112 inclusive, are additively inserted in series with the inductance 212 to increase the input circuit inductance and thereby lower the frequency to which the input circuit of the tube 203 is tuned.

With the above described input circuit switching arrangement the antenna system 10 is matched to the input circuit of the tube 203 over both the high and low frequency portions of the V. H. F. band without providing additional switch contacts for any of the input transformer windings. Furthermore, the provision of two secondary windings, one for the high frequency V. H. F. stations and the other for the low frequency V. H. F. stations insures that the high frequency circuits are not capacity loaded by the greater inductance low frequency circuits and that the low frequency inductances are not shunted out of the circuit by the smaller high frequency inductances.

The output circuit of the tube 203 is tuned in a similar manner by inserting inductive increments into the output circuit thereof. Thus, in the channel 13 position the anode of the tube 203 is tuned by means of the common inductance 207 and the inductance formed by that portion of the rotor 150 included between the contacts 151 and 152. In the channel 12 position the rotor 150 is moved so that the contacts 151 and 153 are connected together and the incremental inductance 152*a* included between the fixed contacts 152 and 153 is inserted in series with the coil 207. Additional inductance is inserted into the anode circuit of the tube 203 in successively lower switch positions to tune the output of this tube to successively lower V. H. F. frequencies. It will be noted that the rotor 141 progressively short circuits the low frequency channel inductances between the contacts 143 to 149, inclusive, to prevent these inductances from acting as trap circuits and causing "suck-outs" or holes in the band pass characteristics of the high frequency channels. The output signals produced at the anode of the tube 203 are coupled through the condenser 215 to one control grid 216 of a combined converter and oscillator tube 217. Preferably the tube 217 is of the commercial type 6X8 and comprises a triode section and a pentode section in the same envelope, the cathodes of the triode and pentode sections being connected together inside the envelope and brought out to a single terminal pin. The pentode section of the tube 217 is used as a converter for the reception of V. H. F. television signals and as an I. F. amplifier for the reception of U. H. F. television signals.

In order to tune the input circuit of the pentode section of the tube 217 there is provided a tuned circuit in which the inductive branch is varied in fixed increments by means of the switch section S–4. Thus, in the channel 13 position the inductance of the switch rotor 160 between the contacts 161 and 162 is connected in series with the coil 220 and the coupling condenser 221 to the first control grid of the pentode section of the tube 217 so as to tune the input circuit of the pentode section to the frequency of channel 13. While the condenser 215 provides sufficient coupling for the high frequency V. H. F. signals, it is necessary to provide increased coupling for the low frequency V. H. F. signals. Accordingly, the condensers 215*a* and 215*b* are provided which couple signals from the anode of the tube 203 to the control grid of the pentode section of the tube 217. The resistor 178 is provided to obtain the correct band width on the low frequency V. H. F. stations and the resistor 179 is connected from the midpoint of the inductance 177*a* to the contact 169 to provide the correct loading and band width for the 44 mc. intermediate frequency to which the tubes 203 and 217 are tuned in the U. H. F. #1 and U. H. F. #2 positions.

In order to bias the pentode section of the tube 217 to the correct operating point for converter operation, the resistor 222 (Fig. 3A) is connected to the cathode of the pentode section of the tube 217 through a circuit which includes the switch contact 161, the switch rotor 160, and the switch contact 169. A second cathode resistor 223 is also connected between the cathodes of the two sections of the tube 217 to ground and is thus connected in parallel with the resistor 222. Appropriate bypass condensers 224 and 225 are respectively connected across the resistors 222 and 223.

For reception of V. H. F. television signals the triode section of the tube 217 is used as a local oscillator and the tube current of the triode section flows through the common cathode resistors 222 and 223. Thus, for V. H. F. television reception the mount of cathode resistance required to bias the pentode section of the tube 217 for proper converter operation is relatively small and is approximately ten times less than that required if no oscillator current is flowing and the pentode section is operated as an amplifier. Accordingly, the resistor 222 is preferably in the order of 220 ohms and the resistor 223 is preferably in the order of 2200 ohms. In the U. H. F.

#1 and U. H. F. #2 positions the local oscillator is deenergized, as discussed briefly in the general description of the system, so that it is necessary in these positions to readjust the bias on the pentode section of the tube 217. This is done by removing the resistor 222 from the cathode circuit of the tube 217 so that the resistor 223 alone furnishes bias for the pentode section. Thus, in the U. H. F. #1 and U. H. F. #2 positions, the contacts 161 and 169 are not connected together through the rotor 160 so that the resistor 222 is disconnected from the cathodes of the tube 217. In this connection it will be understood that the triode and pentode sections of the tube 217 may comprise separate tubes insofar as the present invention is concerned and the term tube is intended to cover arrangements having separate converter and oscillator tubes as well as the illustrated single envelope arrangement.

The local oscillator including the triode section of the tube 217 is tuned by fixed inductive increments by means of the switch section S–5 and a vernier tuning condenser 230 is provided to adjust the frequency of the local oscillator for precise tuning to the received station. The tuning condenser 230 is mechanically connected to the tuning knob 11*b* of the V. H. F. tuner 11 through the shaft 11*d* so that the frequency of the local oscillator may be varied over a range of 2 to 4 megacycles, after the station has been selected by operation of the selector knob 11*a*, to permit precise adjustment of the local oscillator to the frequency of the received signal. In the channel 13 position the inductive branch of the local oscillator tank circuit comprises the inductance of the switch rotor 180 between the contacts 181 and 182 together with the main tuning inductance 231, which, with the tube and circuit capacities is tuned to the frequency of channel 13. The vernier tuning condenser 230 is connected through the contacts 196 and 197 to only a part of the inductance 231 so as not to provide too great a frequency variation at the upper end of the V. H. F. band. Feedback sufficient to sustain oscillations is provided between the tank circuit and the control grid of the triode section of the tube 217 through the condenser 232. In the channel 12 position, the switch contacts 181 and 183 are connected together so that the incremental inductance 182*a* connected between the contacts 182 and 183 is inserted in series with the inductance 231, thereby lowering the frequency of the oscillator tank circuit. Anode operating potential for the local oscillator is supplied from the +B conductor through the resistor 235, the incremental inductances between the contacts 182 to 194, inclusive, the switch rotor 180, and the inductance 231. Oscillations produced at the anode of the triode section of the tube 217 in the high frequency V. H. F. switch positions are coupled to the control grid of the pentode section thereof through the condenser 238. For the low frequency V. H. F. stations the condenser 238*a* provides additional oscillator injection to the control grid of the converter stage through the inductances between the contacts 168 to 162, inclusive, the inductance 220 and the condenser 221. The pentode section operates as a conventional mixer or converter to produce the desired intermediate frequency in the output circuit thereof. Specifically, the anode of the pentode section is connected through the inductance 239 and the resistor 240 to the +B conductor, and the condenser 241 is provided so that the output circuit of the pentode section is tuned to the desired intermediate frequency band, preferably having a nominal center frequency of 44 mc.

From the foregoing detailed description it will be evident that in the V. H. F. channel positions 2 to 13, inclusive, the stage 90 is operated as a tuned radio frequency amplifier, the stage 92 is operated as a converter, and the stage 95 is operated as a local oscillator so as to produce in the output circuit of the stage 92 an intermediate frequency signal which may be amplified in the intermediate frequency amplifier 12 of the television receiver. When the selector switch is moved to either one of the switch positions U. H. F. #1 or U. H. F. #2, the stage 90 is operated as an I. F. amplifier to amplify the intermediate frequency signal produced by the U. H. F. tuner 25 in the manner described above. The stage 92 is also operated in either of these positions as in I. F. amplifier for the intermediate frequency signal produced by the U. H. F. tuner 25, and anode potential is removed from the local oscillator stage 95.

In Figs. 8 to 16, inclusive, there are shown the structural details of a suitable antenna input transformer 200 which may be employed to match the 300 ohm input cable of the antenna system 10 to the input circuit of the tube 203 in either of the low frequency or high frequency portions of the V. H. F. television band. Referring to these figures, there is provided an elongated cylindrical core 300 which is preferably of powdered iron or other suitable ferromagnetic material and has a length of one half inch and a diameter of .1 inch. The high frequency secondary winding 200*a* is comprised of a relatively wide flat strip of conductive metal, such as copper, which is wound directly on the core 300 in the manner shown in Fig. 8. It will be noted that the end portions 301 and 302 of the high frequency secondary winding 200*a* are formed so that they extend away from the ends of the core 300 in a direction generally parallel to the axis thereof. It will also be noted that the secondary winding 200*a* is wound flatwise along the length of the core 300 so that it conforms substantially to the cylindrical surface thereof.

On top of the high frequency secondary winding 200*a* there is wound a low frequency secondary winding 200*b* (Fig. 10). The secondary winding 200*b* preferably comprises a wire of cylindrical cross-section which is coated with suitable insulating material, such as #32 heavy Formvar wire, and one end 303 of the secondary winding 200*b* is wound about and electrically connected to the tab end 301 of the high frequency secondary winding 200*a*, as best illustrated in Fig. 10. The pitch of the secondary winding 200*b* is approximately twice that of the high frequency winding 200*a*, and the other end portion 304 thereof is formed so that it extends away from the end of the core 300 in a direction generally parallel to the axis thereof. A single layer of insulating tape 306 (Fig. 12) is wound over the secondary windings 200*a* and 200*b* and is overlapped so that the windings 200*a* and 200*b* are completely insulated.

The balanced primary winding including the sections 200*c* and 200*d* is wound on top of the insulating tape 306 in the manner shown in Fig. 14. Thus, referring to this figure, the primary winding includes a pair of cross-wound sections 200*c* and 200*d* which are twisted together at the point 310 and are cross-wound in the same direction along the length of the core 300 and on top of the tape 306. The cross-wound sections 200*c* and 200*d* terminate in a common center tap lead 311 which is twisted for a substantial length to form the portion 312 which is looped back over the cross-wound portions 200*c* and 200*d* in the manner shown in Figs. 15 and 16, and the end of the center tap portion 312 is wound about and connected to the tab portion 301 of the high frequency secondary winding 200*a* by any suitable means such as soldering, or the like. The twisted portions of the center tap lead 312 are soldered for the entire length of the lead and, as best illustrated in Fig. 16, the center tap lead 312 is dressed so that it loops away from the cross-wound portions 200*c* and 200*d* of the primary winding.

With this construction the high frequency secondary winding 200*a* effectively matches the 300 ohm impedance of the antenna input cable, which is connected to the ungrounded ends of the primary windings 200*c* and 200*d*, to the input circuit of the tube 203 for the efficient reception of signals from television stations in the high frequency V. H. F. band. On the other hand, the secondary winding 200*b* effectively matches the 300 ohm antenna input impedance to the input circuit of the tube 203 for signals from television stations in the low frequency V. H. F. band. Because of the fact that the secondary windings 200a and 200b are closely coupled, short circuiting the winding 200b in the manner described in detail hereinafter during reception of signals in the U. H. F. television band will effectively suppress V. H. F. signals appearing on either of the windings 200a or 200b. Also with this arrangement, interference from FM stations which are situated between the low frequency and high frequency V. H. F. television bands is positively avoided as a result of the complete damping out of all signals which may be coupled to either of the secondary windings 200a or 200b.

Considering now the operation of the universal V. H. F. tuner 11, when the station selector switch is moved to the U. H. F. #1 position, the intermediate frequency signal from the U. H. F. tuner 25, which preferably has a nominal frequency of 44 mc., is coupled through the inductance 245 (Fig. 3A), the switch contacts 113 and 98, the condenser 201 and the inductance 202 to the control grid of the tube 203. The condenser 246 together with the inductances 245 and 202 and the input capacity of the tube 203 tunes the input circuit of the tube 203 to the desired intermediate frequency. In the same switch position, the switch contacts 132 and 133 are connected together by means of the rotor segment 130a so that +B operating potential is supplied over the conductor 27 to the local oscillator of the U. H. F. tuner 25 so that this tuner is made operative to convert received U. H. F. television signals into corresponding 44 mc. intermediate frequency signals. The local oscillator of the tuner 25 is preferably tuned above the U. H. F. signal for 44 mc. I. F. operation, i. e., a single conversion system. Also in this position, the contacts 137 and 138 are connected together through the rotor segment 135b so that an alternating current is supplied to the output terminal 38 to energize the indicator lamp 36 (Fig. 1). The operator is thus advised that the receiver is connected for U. H. F. reception when the V. H. F. station selector switch is thrown to the U. H. F #1 position.

In the U. H. F. #1 position, the output current of the tube 203 is tuned to 44 mc. by the total of the inductance increments connected between the contacts 152 to 158, inclusive, and 143 to 149, inclusive, and the inductance 207 together with the tube and circuit capacities. The input circuit of the pentode section of the tube 217 is also tuned to 44 mc. by the total of the inductance increments between the contacts 162 to 168, inclusive, and 172 to 171, inclusive, the inductance 220 and the associated tube and circuit capacities. In this position the rotor 180 is disconnected from the fixed contacts 182 to 194, inclusive, so that the +B circuit for the oscillator tube is broken and operating potential is removed from the local oscillator stage. When operating potential is removed from the local oscillator tube, the flow of current through the common cathode resistor 222 is substantially decreased so that it becomes necessary to readjust the operating point of the stage 92 so that it may operate properly as an I. F. amplifier. To this end, the connection of the resistor 222 to the cathodes of the tube 217 is broken in the U. H. F. #1 position since the switch contact 161 is not connected to the switch rotor 160, and the resistor 222 and condenser 224 are thus removed from the cathode circuit of the tube 217. The cathode resistance of the pentode section of the tube 217 then becomes equal to the resistor 223 alone, which resistor is of the correct value for proper I. F. amplifier operation.

In order to prevent V. H. F. signals which are received by the antenna system 10 from interfering with the operation of the stages 90 and 92 as 44 mc. I. F. amplifiers for U. H. F. reception, the secondary winding 200b is short circuited through the contact 134a, the rotor section 130b and the contact 134 in both the U. H. F. #1 and U. H. F. #2 positions. Since the secondary windings 200a and 200b are closely coupled, as described in more detail above, the short circuit on winding 200b effectively short circuits the winding 200a so that no V. H. F. signals are presented to the input circuit of the tube 203 in these positions.

As described generally above in connection with the system diagram of Fig. 1, the universal V. H. F. tuner 11 is also adapted to operate with two single-station U. H. F. tuners in which case it is desirable to switch operating potential from one tuner to the other and also to indicate which tuner, i. e. which single U. H. F. station, is being selected. For this type of V. H. F. reception, a single station U. H. F. tuner 45 (Fig. 1) is substituted for the continuous U. H. F. tuner 25 and the intermediate frequency output thereof is connected to the input terminal 30 so that the intermediate frequency signal is amplified in the stages 90 and 92 in the manner identical to that described above in connection with the continuous tuner 25. A second single station tuner 46 (Fig. 1) is connected to the alternative input terminal 30a which is selectively connected to the input circuit of the tube 203 when the selector switch is thrown to the U. H. F. #2 position. The inductance 245a and the condenser 246a perform the same functions as the inductance 245 and the condenser 246 in tuning the input circuit of the tube 203 to 44 mc. In the U. H. F. #2 position the switch rotor segment 130a is moved to connect the contacts 131 and 132 so that operating potential is shifted from the first single station tuner 45 to the second single station tuner 46. Also, the switch rotor segment 135b is moved to connect the contacts 136 and 137 so that alternating current is shifted from the indicator lamp 36 to the indicator lamp 37. Either one of the single station tuners 45 or 46 may be selected merely by throwing the V. H. F. station selector switch to the U. H. F. #1 or U. H. F. #2 position and the indicator lamps 36 and 37, which may be of different colors, are used to indicate to the operator which U. H. F. station is being received. In this connection, it will be understood that the single station U. H. F. tuners 45 and 46 may comprise any suitable circuit arrangement for receiving a single station within the U. H. F. band. For example, the U. H. F. tuners 45 and 46 may be substantially identical to the continuous U. H. F. tuner 25 shown in Fig. 2 and described in detail above, with the exception that the controls for the tank circuits 60, 62 and 66 thereof are screwdriver adjustments and are not ganged together to a common tuning shaft. Preferably, when two single station tuners are employed, one of the tuners such as the tuner 45 is constructed to tune through the lower half of the U. H. F. television band and the other tuner 46 is arranged to tune through the upper half of the U. H. F. band. With this arrangement, a U. H. F. station anywhere in the U. H. F. television band may be selected by adjustment of the tuning of these tuners either at the factory or by a serviceman in the home.

As discussed generally above, the universal V. H. F. tuner 11 is also adapted to operate in a dual conversion system for the reception of U. H. F. signals in which case the tuner 11 performs the second frequency conversion. In order to provide such a dual conversion tuning arrangement while retaining the incremental inductance tuning arrangement described in detail above, a station selector switch position between the channel 6 and channel 7 positions, i. e., the switch position U. H. F. Alt., is reserved for this type of operation. In a dual conversion system a continuous U. H. F. tuner 47 is used to convert the received U. H. F. signals into corresponding intermediate frequency signals which fall between the frequencies of channels 6 and 7. For example, the intermediate frequency band of the U. H. F. tuner 47 may have a nominal center frequency of 133 mc.

In the U. H. F. Alt. switch position, i. e., the dual conversion position of the universal V. H. F. tuner 11, the intermediate frequency output of the tuner 47 is connected to the input terminal 30b and signals from the tuner 47 are coupled through the inductance 248, the switch contacts 106 and 98, the condenser 201 and the inductance 202 to the control grid of the tube 203. The inductance 248 is of sufficient value to tune the input circuit of the tube 203 to 133 mc. with the other circuit constants mentioned. In the U. H. F. Alt. position, rotor segment **130*a* connects the contacts 132*a* and 133*a* so that operating anode potential is supplied to the local oscillator of the U. H. F. tuner 47 over the conductor 27*b* and the rotor segment 135*a* connects the contacts 137 and 137*a* so that alternating current is supplied to the indicator lamp 37*a* to indicate that the tuner 47 is in operation. In this connection it will be noted that the universal V. H. F. tuner 11 is adapted to operate with the two single station U. H. F. tuners 45 and 46 and the U. H. F. continuous tuner 47 at the same time. Such an arrangement would be desirable in the event that a continuous tuner is provided which covers only a portion of the U. H. F. band. However, it will be understood that any one of the U. H. F. tuners 25, 45, 46 and 47 may be employed alone and the V. H. F. tuner 11** is adapted to operate therewith.

In the U. H. F. Alt. position it is also necessary to short circuit the V. H. F. input transformer 200 to prevent V. H. F. signals from interfering with U. H. F. reception. To this end, the rotor section **135*b* is used to connect the contacts 139 and 140 together to short circuit the secondary winding 200*b*. In this connection it will be noted that rotor segment 135*a* performs a dual function. Thus, the rotor segment 135*a* connects alternating current to the indicator lamps in the U. H. F. #1 and U. H. F. #2 positions and short circuits the winding 200*b* in the U. H. F. Alt. position. In the U. H. F. Alt. position, the secondary winding 200*a* is also open-circuited when the switch contacts 106 and 98 are connected together so that the V. H. F. antenna sysem 10 is completely isolated from the input circuit of the tube 203** in the U. H. F. Alt. position.

Since the first I. F. frequency of the dual conversion system is chosen in between the carrier frequencies of the V. H. F. channels 6 and 7, the incremental inductance arrangement used in the switch sections S3, S4 and S5 may be used without change in the U. H. F. Alt. position. Thus, the switch contacts 151, 142, and 143 are connected together in this position so that the incremental inductances included between the fixed contacts 152 and 143 are inserted in the output circuit of the tube 203 to tune this tube to 133 mc. Likewise, all of the incremental inductances connected between the terminals 162 to 168, inclusive, and 172 are inserted in the input circuit of the pentode section of the tube 217 and this tube is likewise tuned to the intermediate frequency of 133 mc. Also, the contacts 181 and 189 are connected together so that the intermediate incremental inductances included between the contacts 182 and 189 are used to tune the local oscillator sufficiently above the first intermediate frequency of 133 mc. to produce a second intermediate frequency output of 44 mc. from the stage 92. In this connection, the local oscillator of the dual conversion U. H. F. tuner 47 is preferably operated below the received U. H. F. signals so that the second frequency conversion performed by the local oscillator stage 95 is compatible with the incremental tuning arrangement used for this oscillator during V. H. F. reception.

From the foregoing general description of the system, it will be recalled that the tuning shaft **11*d*, which is mechanically connected to the tuning condenser 230, is also ganged to the main tuning shaft of the U. H. F. tuner, when a continuous type U. H. F. tuner is employed, so that the conventional vernier tuning knob 11*b* of the V. H. F. television receiver may be used as a station selector knob for U. H. F. reception. When a dual conversion system is employed and the station selector switch is thrown to the U. H. F. Alt. position, it is necessary to remove the tuning condenser 230 from the local oscillator circuit of the V. H. F. tuner 11 since variation of the tuning knob 11*b* during selection of a U. H. F. station would produce a corresponding variation in the second I. F. frequency if the condenser 230 remained in the circuit. To this end, the condenser 230 is switched out of the circuit in the U. H. F. alternate position by means of the switch wafer S–6 and the tuning condenser 230*a*, which is not mechanically ganged to the tuning shaft 11*d*, is substituted in place of the condenser 230 by connecting the contacts 197 and 198 and opening the contacts 196 and 197. The condenser 230*a* may be adjusted to give the correct local oscillator frequency during dual conversion reception, but is unaffected by any tuning of the U. H. F. tuner 47**.

In Figs. 4 and 5 there is illustrated one arrangement for mechanically ganging the tuning shaft **11*d* of the V. H. F. tuner 11 to the main tuning shaft of a U. H. F. tuner such as the continuous type U. H. F. tuner 25 shown in Fig. 1, so that the tuning knob 11*b*, which is used for precise adjustment of the local oscillator in the V. H. F. tuner 11 during V. H. F. reception, may be used for station selection during U. H. F. reception. Referring to these figures, the V. H. F. tuner 11 is illustrated as mounted upon a conventional television receiver chassis 320 which is positioned within a conventional television cabinet, the front panel of which is shown in fragmentary form at 321. The front panel 321 is provided with an aperture 322 which is adapted to receive the coaxial station selector shaft 11*c* and vernier tuning shaft 11*d* to which are respectively connected the station selector knob 11*a* and the vernier tuning knob 11*b*. The U. H. F. tuner 25, which, as stated before, may comprise any suitable tuning arrangement for converting U. H. F. television signals into corresponding intermediate frequency signals and which is continuously variable by means of the common tuning shaft 81, is shown as positioned immediately above and supported upon the upper deck of the V. H. F. tuner sub-chassis 323. Thus, the U. H. F. tuner is provided with downwardly extending feet, one of which is shown at 324, which spaces the tuner 25 sufficiently above the deck of the sub-chassis 323 to provide clearance for the tubes of the V. H. F. tuner 11 and the main tuning shaft 81 of the U. H. F. tube 25 is positioned directly above the tuning shaft 11*d* of the V. H. F. tuner 11. In order to gang the tuning shaft 11*d* and the main tuning shaft 81 of the U. H. F. tuner 25, a wheel pulley 325 is provided which is mounted on the shaft 81 behind the front panel 321 and carries on the front side thereof the U. H. F. station indicator dial 80 which may be viewed from the front panel of the receiver through the aperture 326 therein. The wheel 325 is connected by any suitable means such as the dial cord 327 to the tuning shaft 11*d* so that these shafts are ganged together and may be operated in unison by tuning the tuning knob 11*b*. In this connection it will be noted that a drive reduction is obtained between the tuning shaft 11*d* and the shaft 81 so that the shaft 81 may be turned at a relatively slow rate by rotation of the tuning knob 11*b*. It will be understood that the arrangement shown in Figs. 4 and 5 is merely for illustrative purposes and any other arrangement may be employed which is suitable to gang the vernier tuning shaft 11*d*** and the main tuning shaft of the V. H. F. tuner and wherein the position of the main tuning shaft is indicated by suitable means.

Considering now the manner in which the universal tuning system of the present invention provides simplified tuning for both V. H. F. and U. H. F. reception, during V. H. F. reception the U. H. F. tuner 25 is deenergized and any one of the twelve existing V. H. F. stations may be selected by adjustment of the station selector knob **11*a* to any one of the channels 2 to 13, inclusive, shown in Fig. 7, and the vernier tuning knob 11*b* is adjusted for precise tuning of the local oscillator in the V. H. F. tuner 11 to produce the best picture, as described in detail above. When the station selector switch is thrown to the U. H. F. #1 position (Fig. 7) the local oscillator in the V. H. F. tuner 11 is deenergized, the stages 90 and 92 therein are operated as I. F. amplifiers, the U. H. F. tuner 25 is energized, and the indicator lamp 36, which is preferably positioned adjacent the front panel opening 326 to illuminate the dial 80, is also energized. U. H. F. stations may then be selected by rotating the tuning knob 11*b* until the desired U. H. F. station is indicated on the dial 80. All of the necessary switching to accomplish the above described operation is performed in the V. H. F. tuner 11 by merely throwing the station selector knob 11*a*** to the U. H. F. #1 position.

When the station selector knob **11*a* is thrown to the U. H. F. Alt. position this same type of operation obtains and U. H. F. stations which are received by the U. H. F. tuner 47 (Fig. 1) are selected in a manner identical to that described above. However, since a dual conversion system is provided in the U. H. F. Alt. position of the station selector switch, the condenser 230 (Fig. 3B) is removed from the circuit and the condenser 230*a* substituted therefor so that the frequency of the local oscillator stage 95 in the V. H. F. tuner 11 remains constant despite rotation of the tuning shaft 11*d*** during the selection of U. H. F. stations.

While the foregoing description has referred to specific frequencies in the V. H. F. and U. H. F. television bands, it will be understood that changes may be made in the present channel assignments in either band without affecting the basic principles of the present invention.

While a particular embodiment of the invention has been shown, it will be understood, of course, that the invention is not limited thereto since many modifications may be made and it is therefore contemplated by the appended claims to cover any such modifications as fall within the true spirit and scope of the invention.

What is claimed as new and is desired to be secured by Letters Patent of the United States is:

1. In a television tuner, the combination of, a local oscillator stage including an energizing electrode, a plurality of tuned circuits, a source of unidirectional potential, a first variable tuning condenser, a second condenser, and station selector switch means having a plurality of V. H. F. station selecting positions and a position for a preceding U. H. F. tuner, said switch means being operable to connect successive ones of said tuned circuits between said energizing electrode and said potential source in successive V. H. F. station selecting positions to vary the frequency of said local oscillator stage by relatively large increments and to connect said first tuning condenser to said local oscillator stage to vary the frequency thereof by relatively small increments in each V. H. F. station selecting position, said switch means being operable in said U. H. F. tuner position to disconnect said first tuning condenser from said local oscillator stage and connect said second condenser to said local oscillator stage in operative circuit relation therein.

2. In a television tuner, the combination of, a local oscillator stage including an energizing electrode, first and second groups of tuned circuits, a source of unidirectional potential, a first variable tuning condenser, a second condenser, and station selector switch means having a group of low band V. H. F. station selecting positions and a group of high band station selecting positions separated by a U. H. F. tuner selecting position, said switch means being operable to connect successive ones of said first group of tuned circuits between said energizing electrode and said potential source in successive low band V. H. F. station selecting positions and operable to connect successive ones of said second group of tuned circuits betwen said energizing electrode and said potential source in successive high band V. H. F. station selecting positions, said switch means being operable in said U. H. F. tuner selecting position to disconnect said first tunng condenser from said local oscillator stage and connect said second condenser to said local oscillator stage in operative circuit relation therein.

3. In a television tuner, the combination of a local oscillator stage including an energizing electrode, a bank of series connected inductors, means coupling one end of said inductor bank to said electrode, a source of unidirectional potential connected to the other end of said bank of inductors, station selector switch means operable to a plurality of V. H. F. station selector positions and to a position for a preceding U. H. F. tuner and having a series of fixed contacts respectively connected to said inductors together with a first movable contact, means connecting said first movable contact to said electrode so that said switch means is operable to connect successive portions of said inductor bank between said electrode and said potential source in said successive V. H. F. station selecting positions, thereby to vary the frequency of said local oscillator stage by relatively large increments, a tuning condenser, a second condenser and means including said switch means for connecting said tuning condenser to said electrode in all of said V. H. F. station selecting positions so that said tuning condenser is operable to vary the frequency of said local oscillator stage by relatively small increments, said switch means being operable in said U. H. F. tuner position to disconnect said tuning condenser from said local oscillator stage and to connect said second condenser in operative relation in said stage.

4. In a television tuner, the combination of a local oscillator stage including an energizing electrode, a bank of series connected inductors, a source of unidirectional potential connected to one end of said bank of inductors, station selector switch means operable to a plurality of V. H. F. station selector positions and to a position for preceding U. H. F. tuner and having a series of fixed contacts respectively connected to said inductors together with a first movable contact, direct current conductive means including an inductance connecting said first movable contact to said electrode so that said switch means is operable to connect successive portions of said inductor bank between said electrode and said potential source in successive V. H. F. station selecting positions, thereby to vary the frequency of said local oscillator stage by relatively large increments, a tuning condenser, a second condenser, and means including a second movable contact of said switch means for connecting said tuning condenser to an intermediate portion of said inductance in all of said V. H. F. station selecting positions in order to vary the frequency of said local oscillator stage by relatively small increments, said switch means being operable in said U. H. F. tuner position to disconnect said tuning condenser from said local oscillator stage and to connect said second condenser to said intermediate portion of said inductance.

5. In a television tuner, the combination of a local oscillator stage including an anode and a control grid, a bank of series connected inductors, means coupling one end of said inductor bank to said control grid, a source of unidirectional potential connected to the other end of said bank of inductors, station selector switch means operable to a plurality of V. H. F. station selector positions and to a position for a preceding U. H. F. tuner and having a series of fixed contacts respectively connected to said inductors together with a first movable contact, means connecting said first movable contact to said anode so that said switch means is operable to connect successive portions of said inductor bank between said anode and said potential source in successive V. H. F. station selecting positions, thereby to vary the frequency of said local oscillator stage by relatively large increments, said switch means including a second movable contact and a plurality of stationary contacts, a tuning condenser connected to a first of said stationary contacts, and a second condenser connected to a second of said stationary contacts, said second movable contact being effective to connect said tuning condenser in operative relation in said local oscillator stage in all of said V. H. F. station selecting positions so that said tuning condenser is operable to vary the frequency of said local oscillator stage by relatively small increments, said switch means being operable in said U. H. F. tuner position to disconnect said tuning condenser from said local oscillator stage and to connect said second condenser in operative relation in said local oscillator stage.

6. In a television tuner, the combination of a local oscillator stage including an anode and a control grid, a bank of series connected inductors, means coupling one end of said bank of inductors to said control grid, a source of unidirectional potential connected to the other end of said bank of inductors, station selector switch means operable to a plurality of V. H. F. station selector positions and to a position for a preceding U. H. F. tuner and having a series of fixed contacts respectively connected to said inductors together with a first movable contact, means including an inductance connecting said first movable contact to said anode so that said switch means is operable to connect successive portions of said inductor bank between said anode and said potential source in successive V. H. F. station selecting positions, thereby to vary the frequency of said local oscillator stage by relatively large increments, said switch means including a second movable contact and a plurality of stationary contacts a first of which is connected to an intermediate portion of said inductance, a tuning condenser connected to a second of said stationary contacts, and a second condenser connected to a third of said stationary contacts, said second movable contact being effective to connect said tuning condenser to said intermediate portion of said inductance in all of said V. H. F. station selecting positions so that the tuning condenser is operable to vary the frequency of said local oscillator stage by relatively small increments, said switch means being operable in said U. H. F. tuner position to disconnect said tuning condenser from said local oscillator stage and to connect said second condenser to said intermediate portion of said inductance.

7. In a television tuner, the combination of a discharge device including an energizing electrode, a plurality of tuned circuits, a first variable tuning condenser, a second condenser, and station selector switch means having a plurality of V. H. F. station selecting positions and a position for a preceding U. H. F. tuner, said switch means being operable to connect successive ones of said tuned circuits in circuit relationship with said energizing electrode in successive V. H. F. station selecting positions to vary, by relatively large increments, the frequency of oscillation of a local oscillator stage including said discharge device and to connect said variable tuning condenser to said discharge device to vary the frequency of oscillation of said oscillator by relatively small increments in each V. H. F. station selecting position, said switch means being operable in said U. H. F. tuner position to render said variable tuning condenser inoperative to control the operation of said discharge device and associated circuit and to connect said second condenser into operative circuit relationship with said discharge device, thereby to alter the mode of operation of said discharge device and associated circuit.

References Cited in the file of this patent

UNITED STATES PATENTS

| | | |
|---|---|---|
| 1,706,193 | Stephens | Mar. 19, 1929 |
| 1,828,094 | Andrewes | Oct. 20, 1931 |
| 1,848,823 | Carlson | Mar. 8, 1932 |
| 1,852,651 | Hansell | Apr. 5, 1932 |
| 2,289,147 | Shea | July 7, 1942 |
| 2,301,934 | Edwards | Nov. 17, 1942 |
| 2,530,329 | Fyler | Nov. 14, 1950 |
| 2,646,500 | Romero | July 21, 1953 |
| 2,668,235 | Nordby | Feb. 2, 1954 |